US012404991B2

(12) United States Patent
Stanek et al.

(10) Patent No.: US 12,404,991 B2
(45) Date of Patent: Sep. 2, 2025

(54) LIGHT SOURCE ALIGNMENT SYSTEM

(71) Applicant: ROBE lighting s.r.o., Roznov pod Radhostem (CZ)

(72) Inventors: Michal Stanek, Valasske Mezirici (CZ); Jan Vilem, Valasske Mezirici (CZ); Tomas David, Podoli (CZ); Josef Valchar, Prostredni Becva (CZ)

(73) Assignee: ROBE lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 18/805,164

(22) Filed: Aug. 14, 2024

(65) Prior Publication Data

US 2024/0401779 A1 Dec. 5, 2024

Related U.S. Application Data

(60) Provisional application No. 63/579,738, filed on Aug. 30, 2023.

(51) Int. Cl.
*F21V 17/02* (2006.01)

(52) U.S. Cl.
CPC .................................... *F21V 17/02* (2013.01)

(58) Field of Classification Search
CPC ...................................................... F21V 17/02
USPC ......................................................... 362/277
See application file for complete search history.

(56) References Cited

U.S. PATENT DOCUMENTS 10,670,224 B1 6/2020 Lin et al.
2019/0376663 A1 12/2019 Gladden et al.
2021/0205939 A1 * 7/2021 Hou ...................... G02B 27/30

FOREIGN PATENT DOCUMENTS

EP 2718619 B1 3/2017
EP 3904757 A1 11/2021

OTHER PUBLICATIONS

European Extended Search Report; Application No. 24195060.9; Jan. 9, 2025; 5 pages.

* cited by examiner

*Primary Examiner* — James R Greece
*Assistant Examiner* — Hana S Featherly
(74) *Attorney, Agent, or Firm* — Conley Rose, P.C.; Brooks W Taylor

(57) ABSTRACT

A luminaire includes a light source emitting a first light beam with a first optical axis. An optical element of the light source alignment system receives the first light beam and emits a second light beam with a second optical axis. The second optical axis is substantially parallel to, but not coaxial with, the first optical axis. A continuously adjustable position of the optical element determines a position of the second optical axis. A method for aligning an optical axis of a light beam includes receiving a first light beam with a first optical axis; emitting a second light beam with a second optical axis that is substantially parallel to, but not coaxial with, the first optical axis; and aligning the second light beam with an optical element of an optical system by adjusting a continuously adjustable position of an optical element relative to the first optical axis.

9 Claims, 7 Drawing Sheets

LIGHT SOURCE ALIGNMENT SYSTEM

CROSS-REFERENCE TO RELATED APPLICATIONS

This patent application claims the benefit of U.S. Provisional Application No. 63/579,738, filed Aug. 30, 2023, entitled "LIGHT SOURCE ALIGNMENT SYSTEM" which is hereby incorporated by reference in its entirety.

TECHNICAL FIELD OF THE DISCLOSURE

The disclosure generally relates to luminaires, and more specifically to a light source alignment system for a luminaire.

BACKGROUND

Some luminaires in the entertainment and architectural lighting markets include automated and remotely controllable functions. Such luminaires may be used in theatres, television studios, concerts, theme parks, night clubs and other venues. A luminaire may provide control over the pan and tilt functions of the luminaire allowing the operator to control the direction the luminaire is pointing and thus the position of the light beam on the stage or in the studio. Such position control may be obtained via control of the luminaire's position in two orthogonal rotational axes, which may be referred to as pan and tilt. Some luminaires provide control over other parameters such as intensity, color, focus, beam size, beam shape, and/or beam pattern.

The optical systems of such automated luminaires may be designed to enable a user to control the beam size, from a very narrow output beam to a wider, wash beam. Such control may allow such luminaires to be used with long throws to a target or for almost parallel light effects, as well as for wider, more traditional wash effects. Optical systems with the ability to produce narrow beams may be referred to as 'Beam' optics, while optical systems with the ability to produce wide beams may be referred to as 'Wash' optics.

SUMMARY

In a first embodiment, a luminaire includes a light source and a light source alignment system. The light source is configured to emit a first light beam having a first optical axis. The light source alignment system is mechanically coupled to the light source and comprises an optical element configured to receive the first light beam and emit a second light beam having a second optical axis, the second optical axis substantially parallel to, but not coaxial with, the first optical axis. A position of the second optical axis relative to the first optical axis is determined by a continuously adjustable position of the optical element relative to the first optical axis.

In a second embodiment, a method for aligning an optical axis of a light beam in a luminaire includes receiving by an optical element a first light beam from a light source, the first light beam having a first optical axis; emitting from the optical element a second light beam having a second optical axis, the second optical axis substantially parallel to, but not coaxial with, the first optical axis; and aligning the second light beam with an optical element of an optical system by adjusting a position of the optical element relative to the first optical axis. The position of the optical element is continuously adjustable and a position of the second optical axis relative to the first optical axis is determined by the position of the optical element relative to the first optical axis.

BRIEF DESCRIPTION OF THE DRAWINGS

For a more complete understanding of this disclosure, reference is now made to the following brief description, taken in conjunction with the accompanying drawings in which like reference numerals indicate like features.

DETAILED DESCRIPTION

Preferred embodiments are illustrated in the figures, like numerals being used to refer to like and corresponding parts of the various drawings.

In some luminaires, aligning a light source with an optical system of the luminaire is achieved by loosely mounting the light source within the luminaire and moving the light source within the luminaire to obtain alignment. Once aligned, the mounting of the light source is tightened up to maintain alignment despite handling, use, transport, or other motion of the luminaire. Where the light source is large, heavy, or attached to non-moving components of the luminaire, such as heat sinks, such alignment may be difficult.

Additionally, where a diameter of the light beam emitted from the light source is small, more precise alignment of the beam with the optical system is desired than for larger diameter beams. The problems described above are especially significant where only small adjustments of the light source relative to the rest of the optical system are required.

Embodiments of light engines according to the disclosure solve such alignment problems by providing a light source alignment system that allows the light engine to remain mounted in the luminaire while only the light source alignment system is loosened and adjusted to obtain alignment of the beam with the optical system. Because the components of the light source alignment system are simpler and lighter, they are easier to loosen, adjust, and retighten.

Furthermore, alignment mechanisms for some light sources may require technician access to the mechanism from several sides of the light source, for example to loosen and tighten the mounting of the light source. Where the luminaire is subject to Ingress Protection (IP) standards relating to intrusion of dust or liquids into the light source, the luminaire may require a complex light source enclosure that can be removed to allow access to the mechanism from several sides and then re-sealed when reattached to satisfy the IP standard.

As described above, the components of embodiments of the light source alignment system according to the disclosure are simpler and lighter than prior light source alignment systems. They also are easier to loosen, adjust, and retighten than prior light source alignment systems. Furthermore, a light source alignment system according to the disclosure need only be accessed from one side, allowing a technician to obtain access by removing and reattaching a single, planar cover. Such a cover is easier to remove and reattach than is a more complex cover, as well as better adapted to re-sealing in order to satisfy a specified IP standard.

Figure 1:
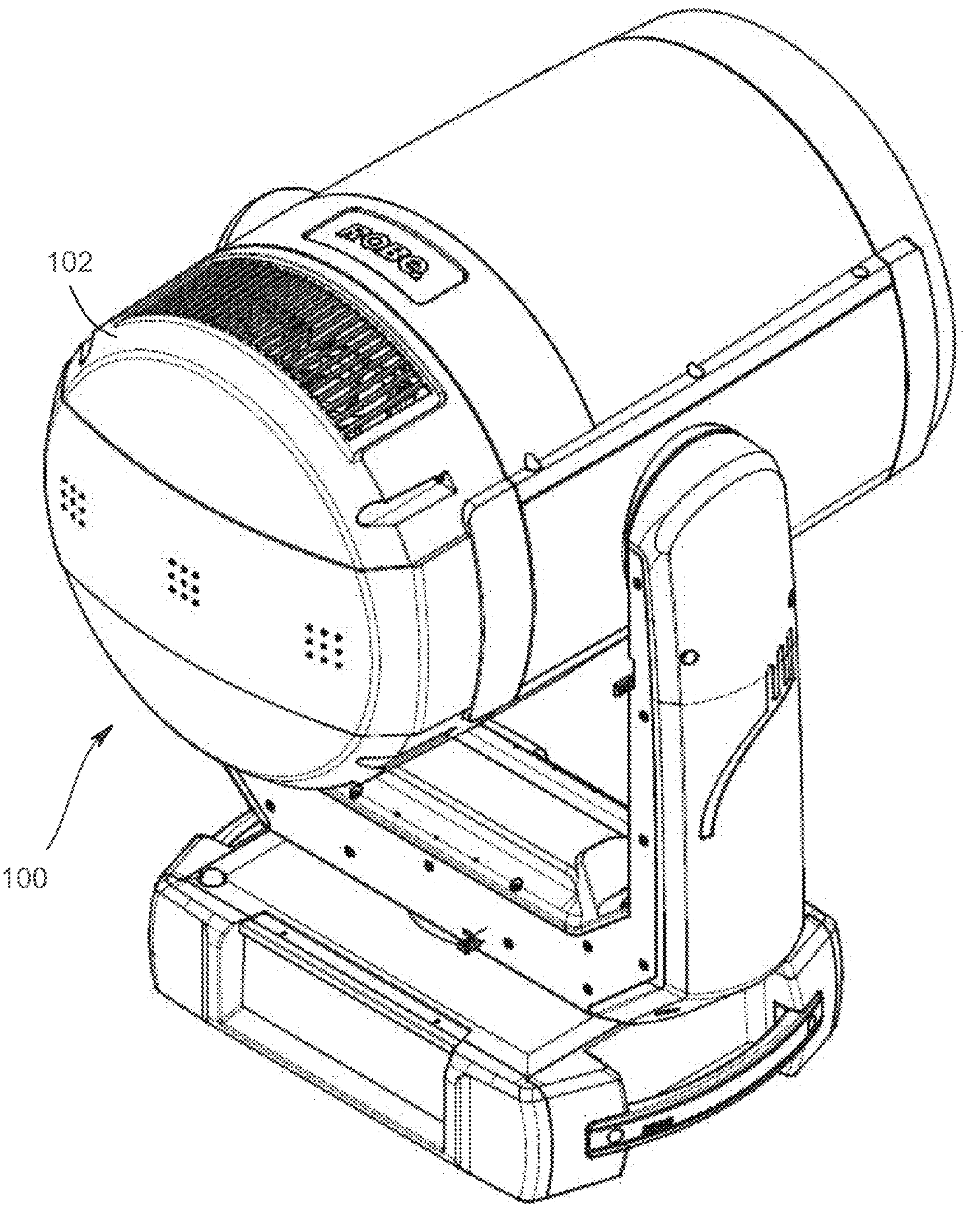
FIG. 1 presents an orthogonal view of a luminaire according to the disclosure.

FIG. 1 presents an orthogonal view of a luminaire 100 according to the disclosure. The luminaire 100 includes a light source enclosure under an external cover 102. In some embodiments, the light source enclosure includes a laser-based light engine that comprises one or more lasers in one or more colors and one or more optical devices that convert a coherent light beam emitted by the laser into an incoherent light beam. Such lasers may include a solid state light emitting diode (LED) laser. The optical devices may comprise phosphor panels or filters. In some such embodiments, the light engine comprises a solid state LED laser emitting coherent blue light that excites a phosphor to emit incoherent white light.

While the luminaire 100 is an automated luminaire configured for pan/tilt motion, it will be understood that light source alignment systems according to the disclosure may be used in other types of luminaires, such as fixed luminaires or tilt-only luminaires. Where the light source is large, heavy, and/or attached to a non-moving component of the luminaire (such as a heat sinks), it can be a problem for an assembly or repair technician to align the light source with other optical elements of the optical system of the luminaire. A light source alignment system according to the disclosure provides a solution to such a problem by allowing the technician to adjust a position of the light source alignment system—rather than the position of the light source—to align the light beam from the light source with other optical elements of the luminaire.

Figure 2:
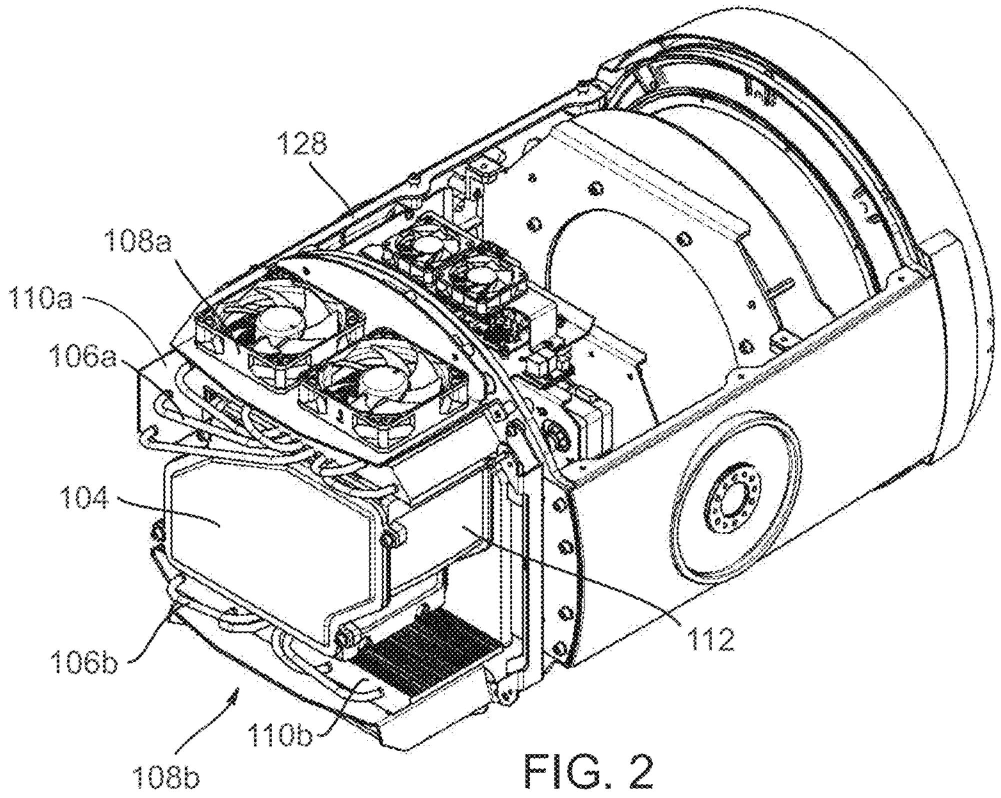
FIG. 2 presents an orthogonal view of the head of the luminaire of FIG. 1 with external covers removed.
Figure 3:
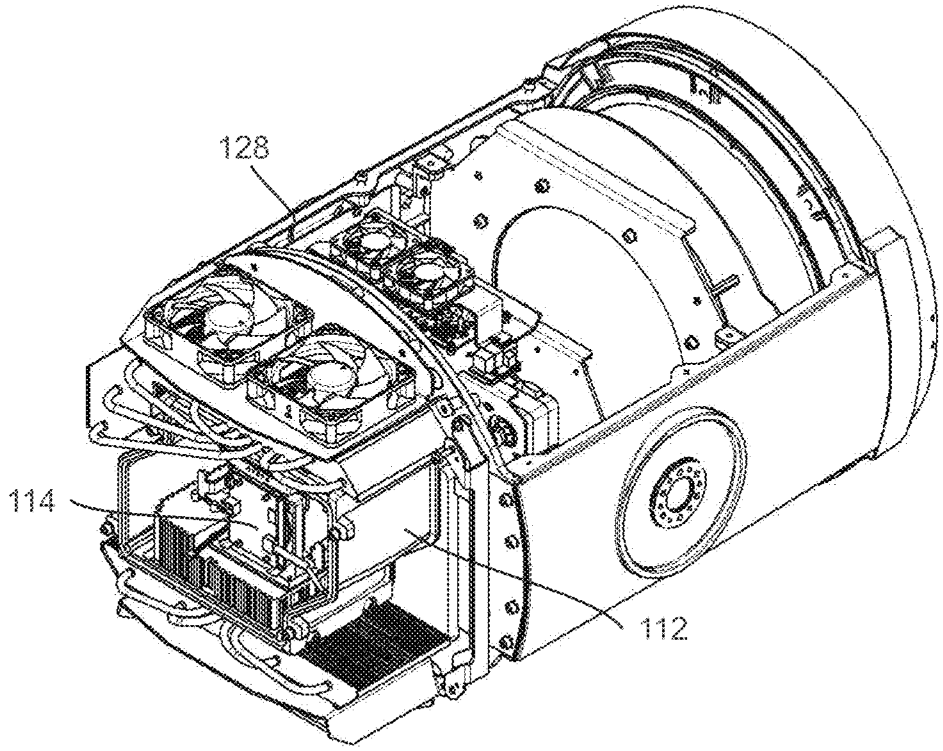
FIG. 3 presents an orthogonal view of the head of the luminaire of FIG. 1 with the light engine exposed.

FIG. 2 presents an orthogonal view of a head 128 of the luminaire 100 of FIG. 1 with external covers removed. A light source enclosure 112 comprises a light source such as the laser light engine described above. Heat pipes **106*a* transfer heat from the light source enclosure 112 to radiators 110*a* which are cooled by fans 108*a*. Similarly, for heat pipes 106*b*, radiators 110*b*, and fans 108*b* (which are not visible in FIG. 2). In some embodiments, the light source enclosure 112 is sealed with a cover 104 to prevent dust, water, or other contaminants from entering the light source enclosure 112. In such embodiments, the heat pipes 106*a* and 106*b* exit the light source enclosure 112 through sealed apertures. In some such embodiments, the light source enclosure 112 is sealed to meet the Ingress Protection 65 (IP65) rating standard. FIG. 3 presents an orthogonal view of the head 128 of the luminaire 100 of FIG. 1 with the cover 104 removed from the light source enclosure 112, exposing the light engine 114**.

Figure 4:
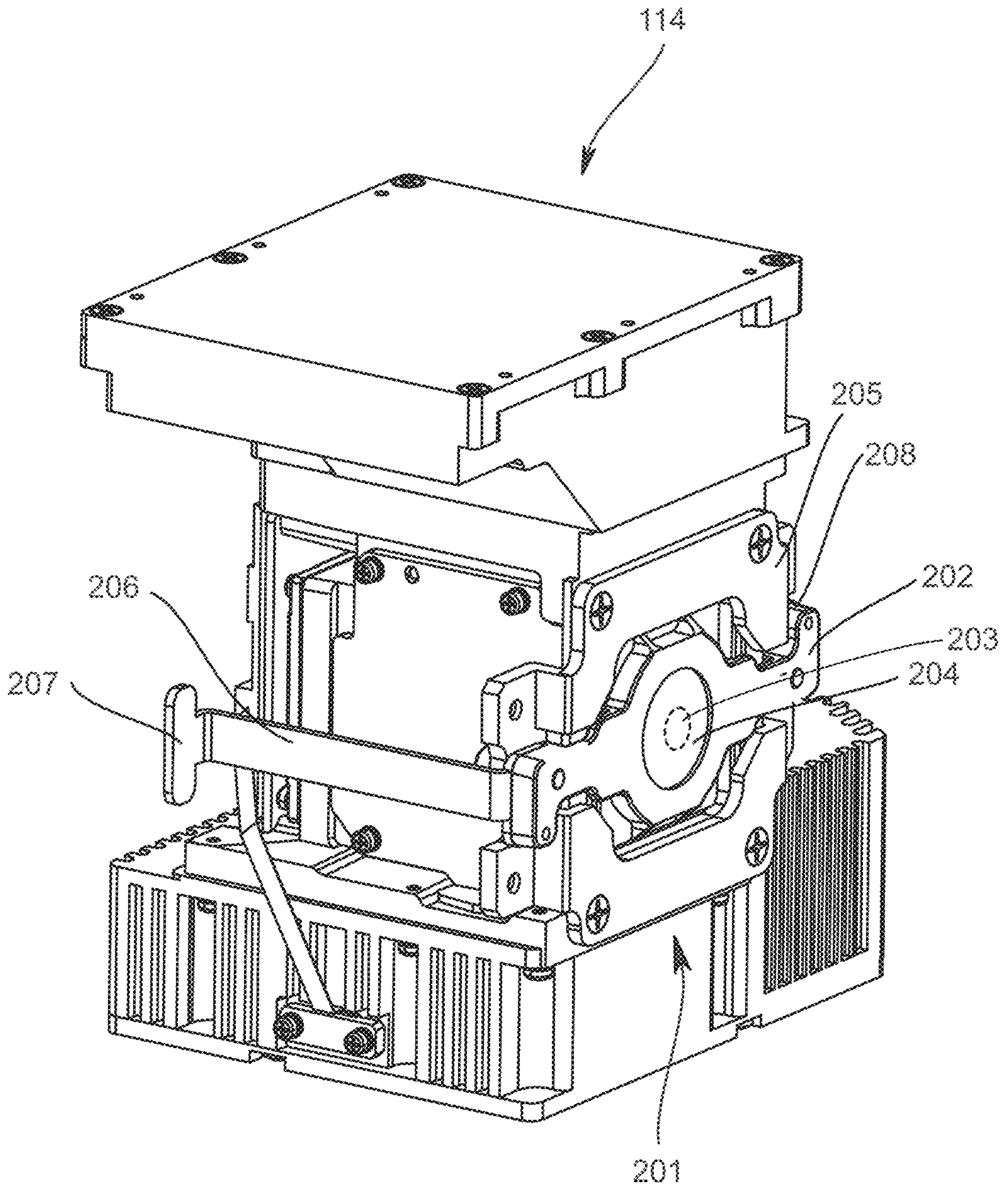
FIG. 4 presents a first orthogonal view of the light engine of the luminaire of FIG. 3.
Figure 5:
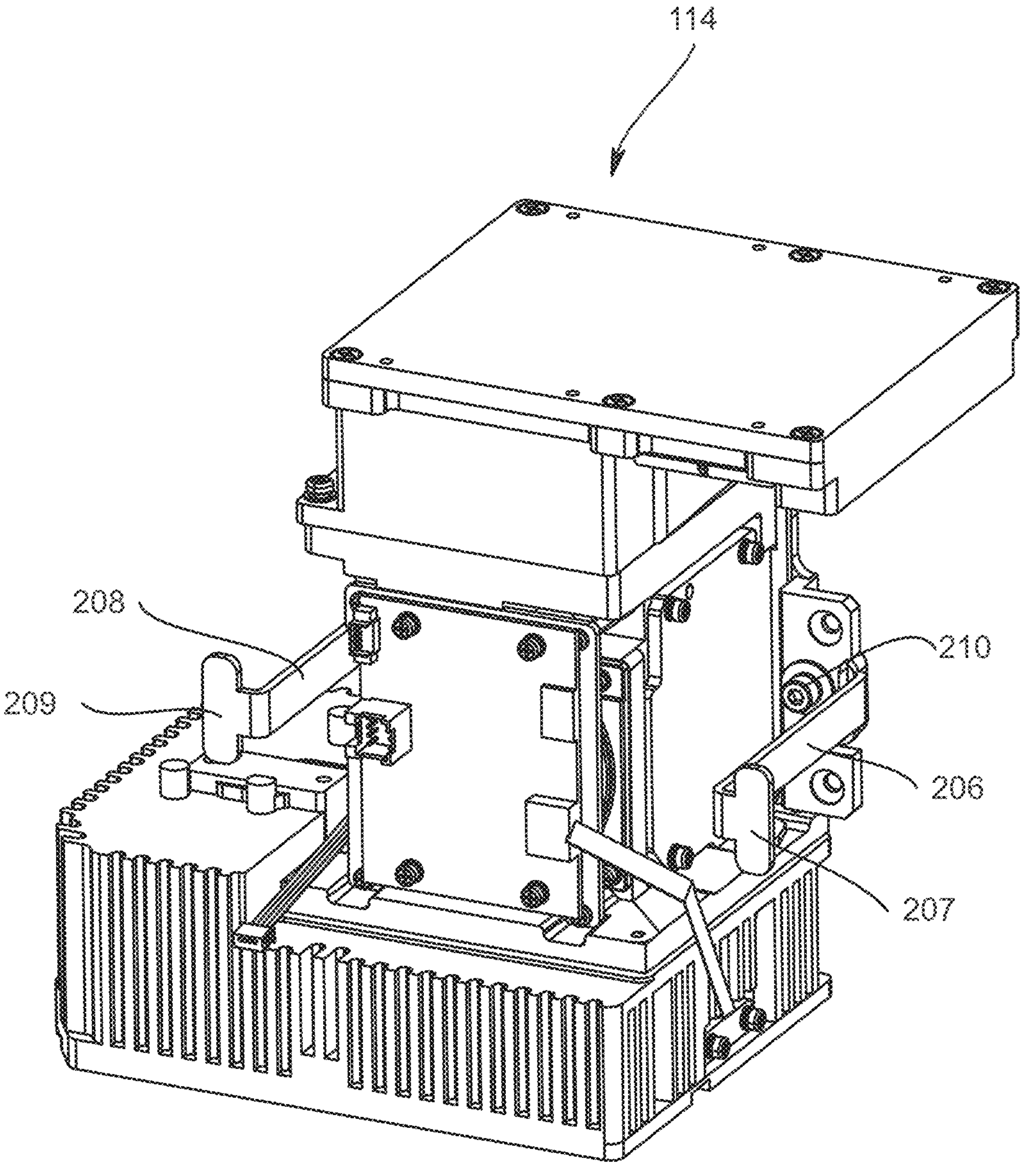
FIG. 5 presents a second orthogonal view of the light engine of the luminaire of FIG. 3.
Figure 6:
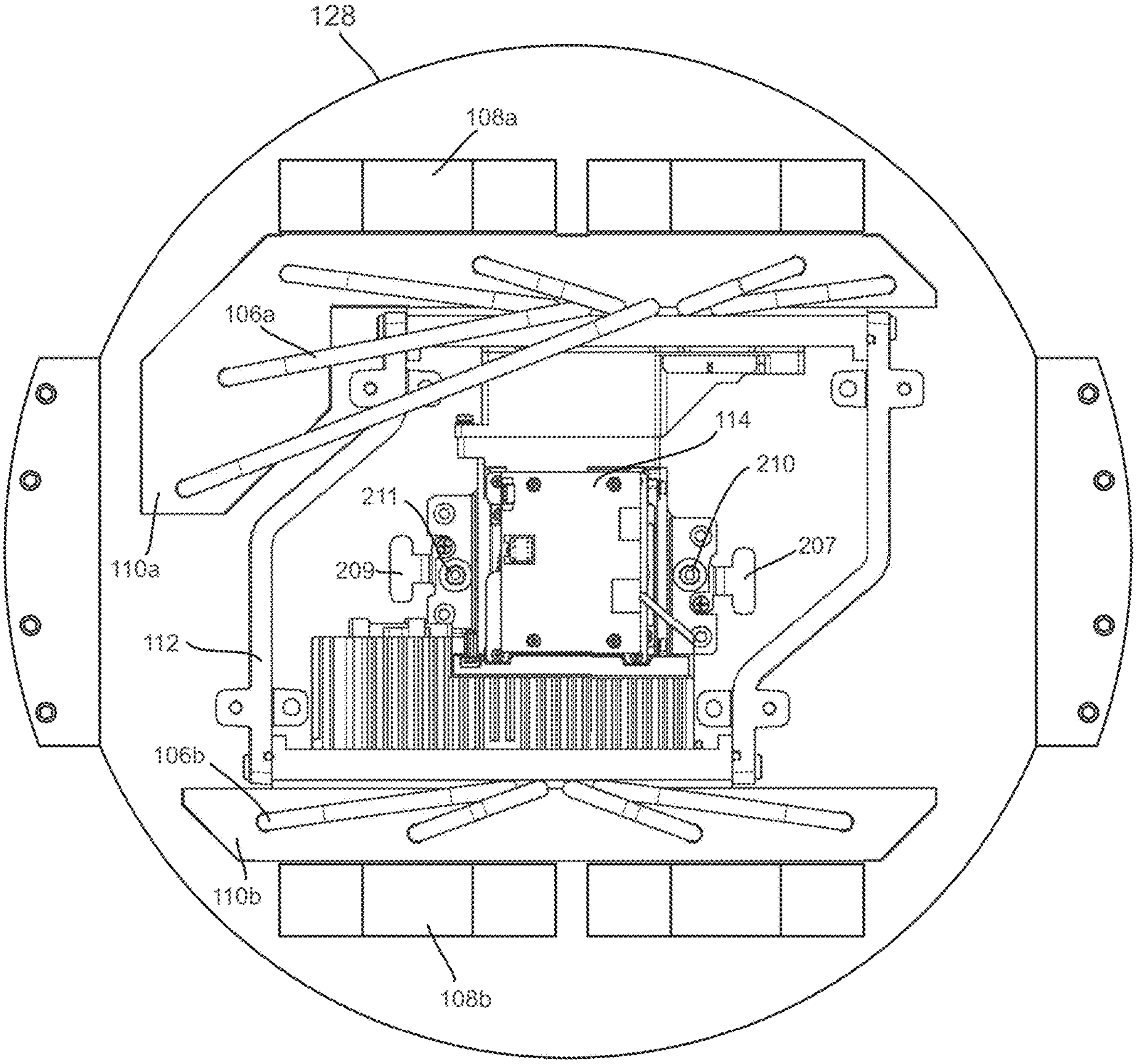
FIG. 6 presents a rear elevation view of a portion of the head of the luminaire of FIG. 1 with the light engine exposed.

FIG. 4 presents a first orthogonal view of the light engine 114 of the luminaire of FIG. 3, from a front-right viewpoint. FIG. 5 presents a second orthogonal view of the light engine 114 of the luminaire of FIG. 3, from a back-right viewpoint. FIG. 6 presents a rear elevation view of a portion of the head of luminaire of FIG. 1 with the light engine 114 exposed.

An emitted light beam exits the light engine 114 through an exit port 203. The exit port 203 may be an aperture or may be an exit surface of an optical device (e.g., a lens) of the light engine 114. The light engine 114 includes a light source alignment system 201. The light source alignment system 201 includes an alignment lens 204, mounted in a lens retainer 202. The lens retainer 202 is coupled to the arms 206 and 208, which include associated operating handles 207 and 209, respectively. The lens retainer 202, and thus the alignment lens 204, is adjustably secured to a planar guide 205 by screws 210 and 211 (visible in FIG. 6). In other embodiments, other fasteners that allow loosening, adjusting, and retightening the lens retainer 202 may be used, such as quarter-turn fasteners and over-center toggle clamps.

The emitted light beam passes through the planar guide 205 into the alignment lens 204, which emits an aligned light beam. In some embodiments, the alignment lens 204 may be an aspheric positive optical power lens configured to direct the aligned light beam towards an imaging aperture of a downstream optical system. In other embodiments the alignment lens 204 may be another optical element, such as a spherical lens or any other type of positive lens such as a Fresnel lens. The alignment lens 204 is larger in diameter than exit port 203.

A back surface of the lens retainer 202 is in contact with a front surface of the planar guide 205. The front surface of the planar guide 205 is perpendicular to an emitted optical axis of the emitted light beam. The lens retainer 202 is thus constrained by the planar guide 205 to move the alignment lens 204 only in directions perpendicular to the emitted optical axis. The screws 210 and 211 pass through corresponding oversized holes in the planar guide 205. When tightened, the screws 210 and 211 clamp the lens retainer 202 to the planar guide 205 to prevent motion of the alignment lens 204 relative to the exit port 203. When loosened, the screws 210 and 211 provide an amount of friction between the lens retainer 202 and the planar guide 205 that allows an operator to adjust a position of the alignment lens 204 relative to the exit port 203 using the operating handles 207 and 209, release the handles to check the position, and tighten the screws 210 and 211 to clamp the alignment lens 204 in a desired position relative to the exit port 203.

The oversized holes allow the position of the alignment lens 204 to be continuously adjustable, without detents or other increments of position change. The holes also allow the alignment lens 204 to be moved in any direction: vertically, horizontally, or diagonally.

In a process for aligning the emitted light beam with downstream optical systems of the luminaire 100, the operator removes the external cover 102 and the cover 104, loosens the screws 210 and 211 and adjusts the operating handles 207 and 209 so as to move the alignment lens 204 to a desired position in front of the exit port 203. The motion may be up, down, left, right, or any combination thereof, such that a center of the alignment lens 204 is moved perpendicularly in any direction relative to the optical axis. When the aligned light beam is aligned to the operator's satisfaction, the screws 210 and 211 are tightened to prevent further movement of the alignment lens 204 relative to the exit port 203, and the cover 104 and the external cover 102 are replaced. In some circumstances, the alignment lens 204 may need to be moved only a few millimeters to achieve alignment.

Figure 7A:
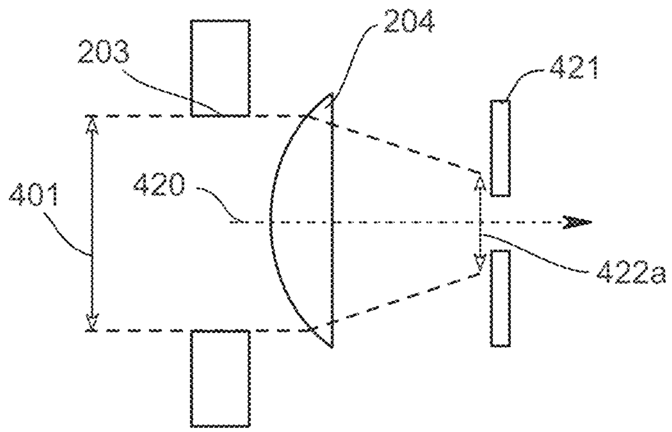
FIGS. 7A, 7B, and 7C present schematic views of first, second, and third configurations, respectively, of a light source alignment system according to the disclosure.
Figure 7B:
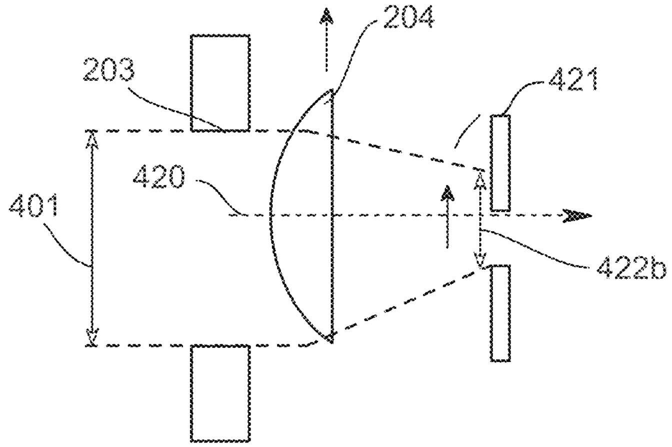
Figure 7C:
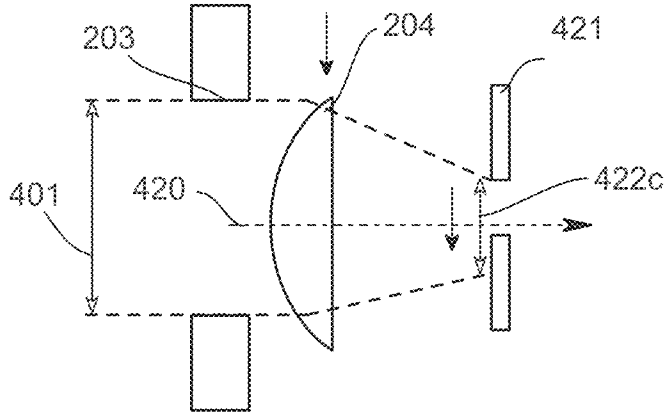

FIGS. 7A, 7B, and 7C present schematic views of first, second, and third configurations, respectively, of the light source alignment system 201 according to the disclosure. FIG. 7A shows a first configuration of the light source alignment system 201, in which a center of the alignment lens 204 is aligned with the optical axis (or center) of an emitted light beam 401 passing through the exit port 203.

The emitted light beam 401 is received directly by the alignment lens 204, without passing through other optical devices of the luminaire 100. In this first configuration, the alignment lens 204 emits an aligned light beam 422*a* having an optical axis 420 that is coaxial with the center of the emitted light beam 401. The aligned light beam 422*a* illuminates an imaging aperture 421 of a downstream optical system. The aligned light beam 422*a* is received directly by the imaging aperture 421, without passing through other optical devices of the luminaire 100.

FIG. 7B shows a second configuration of the light source alignment system 201, in which the alignment lens 204 has been moved perpendicularly, relative to the optical axis of the emitted light beam 401, in an upwards direction from its position in the first configuration. In this second configuration, the alignment lens 204 emits an aligned light beam 422*b*. The optical axis 420 of the aligned light beam 422*b* is positioned above the optical axis of the emitted light beam 401 and is substantially parallel to, but not coaxial with, the optical axis of the emitted light beam 401. For the purposes of this disclosure, the term "substantially parallel" means diverging from parallel by no more than 5° (degrees). In this way, the position of the optical axis 420 relative to the optical axis of the emitted light beam 401 is determined by the continuously adjustable position of the alignment lens 204 relative to the optical axis of the emitted light beam 401. The aligned light beam 422*b* illuminates an area that is centered above the center of the imaging aperture 421.

FIG. 7C shows a third configuration, in which in which the alignment lens 204 has been moved perpendicularly, relative to the optical axis of the emitted light beam 401, in a downwards direction from its position in the first configuration. In this third configuration, the alignment lens 204 emits an aligned light beam 422*c*. The optical axis 420 of the aligned light beam 422*c* is positioned below the optical axis of the emitted light beam 401 and is substantially parallel to, but not coaxial with, the optical axis of the emitted light beam 401. The aligned light beam 422*c* illuminates an area that is centered below the center of the imaging aperture 421.

Although FIGS. 7A, 7B, and 7C describe moving the alignment lens 204 upwards and downwards (i.e., within the plane of the page), the light source alignment system 201 is configured to move the alignment lens 204 in any direction that is perpendicular to the optical axis. In this way, the exit beam may be adjusted in any direction relative to the center of the emitted light beam 401, so as to correct any offset of position or angle between the light engine 114 and the imaging aperture 421 of the downstream optical system.

Figure 8:
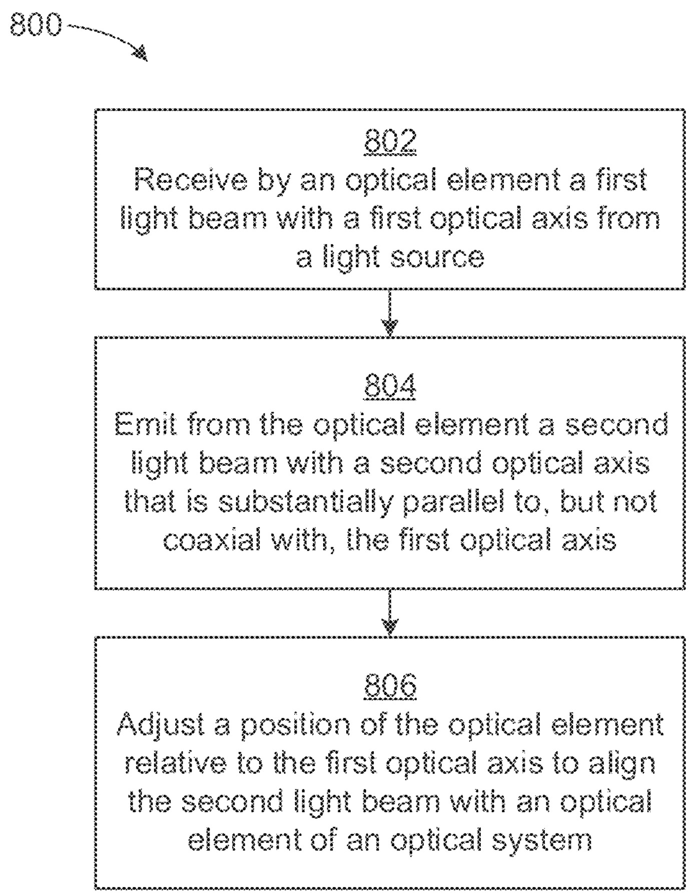
FIG. 8 presents a flowchart of a method for aligning an optical axis of a light beam in a luminaire.

FIG. 8 presents a flowchart of a method 800 for aligning an optical axis of a light beam in a luminaire. In step 802, an optical element receives from a light source a first light beam having a first optical axis. In step 804, the optical element emits a second light beam having a second optical axis. The second optical axis is parallel to, but not coaxial with, the first optical axis. In step 806, a technician adjusts a position of the optical element relative to the first optical axis to align the second light beam with an optical element of an optical system. In some embodiments, adjusting the position of the optical element comprises loosening a fastener to allow adjustment of the position of the optical element, moving the optical element perpendicularly relative to the first optical axis, and tightening the fastener to prevent motion of the alignment lens relative to the first optical axis.

While only some embodiments of the disclosure have been described herein, those skilled in the art, having benefit of this disclosure, will appreciate that other embodiments may be devised which do not depart from the scope of the disclosure herein. While the disclosure has been described in detail, it should be understood that various changes, substitutions, and alterations can be made hereto without departing from the spirit and scope of the disclosure.

What is claimed is:

1. A luminaire comprising:

a light source configured to emit a first light beam having a first optical axis; and a light source alignment system mechanically coupled to the light source, the light source alignment system comprising an optical element configured to receive the first light beam and emit a second light beam having a second optical axis, the second optical axis substantially parallel to, but not coaxial with, the first optical axis, wherein a position of the second optical axis relative to the first optical axis is determined by a continuously adjustable position of the optical element relative to the first optical axis, and wherein the light source alignment system comprises fasteners configured to (i) loosen to allow adjustment of the position of the optical element relative to the first optical axis, and (ii) tighten to prevent motion of an alignment lens relative to the first optical axis.

2. The luminaire of claim 1, further comprising an imaging aperture configured to receive the second light beam, wherein:

the first light beam is received directly by the light source alignment system, without passing through another optical device of the luminaire between the light source and the light source alignment system; and the second light beam is received directly by the imaging aperture, without passing through another optical device of the luminaire between the light source alignment system and the imaging aperture.

3. The luminaire of claim 1, wherein the optical element comprises the alignment lens configured to move perpendicularly relative to the first optical axis.

4. The luminaire of claim 3, wherein the alignment lens is an aspheric positive optical power lens.

5. The luminaire of claim 3, wherein:

the light source alignment system comprises a planar guide and a lens retainer;

the planar guide is configured to allow passage of the first light beam; and the lens retainer is adjustably secured to the planar guide and configured to mount the alignment lens.

6. The luminaire of claim 5, wherein:

a back surface of the lens retainer is in contact with a front surface of the planar guide; and the lens retainer is constrained by the front surface of the planar guide to move the alignment lens in one or more directions perpendicular to the first optical axis.

7. The luminaire of claim 5, wherein the lens retainer comprises an arm and an associated handle configured to allow a technician to adjust the position of the optical element relative to the first optical axis.

8. The luminaire of claim 1, wherein:

the luminaire comprises a light source enclosure enclosing the light source and the light source alignment system;

the light source enclosure comprises a cover configured to provide access to the light source alignment system when the cover is removed from the light source enclosure; and the light source enclosure is configured to allow a technician access to loosen the fasteners, to adjust the position of the optical element relative to the first optical axis, and to tighten the fasteners.

9. The luminaire of claim 8, wherein the cover and the light source enclosure are configured to seal the light source enclosure to meet an Ingress Protection 65 (IP65) rating standard when the cover is attached to the light source enclosure.

* * * * *